May 12, 1970 M. JUNG ET AL 3,511,710
METHOD OF DIRECTLY CONVERTING THE CHEMICAL ENERGY OF
COMPLEX HYDRIDES INTO ELECTRICAL ENERGY
Filed July 28, 1965 2 Sheets-Sheet 1

INVENTORS.
MARGARETE JUNG
HANNS H. KROEGER
BY Alfred Stapler
ATTORNEY

United States Patent Office 3,511,710
Patented May 12, 1970

3,511,710
METHOD OF DIRECTLY CONVERTING THE CHEMICAL ENERGY OF COMPLEX HYDRIDES INTO ELECTRICAL ENERGY
Margarete Jung, Nieder-Eschbach, Germany, and Hanns H. Kroeger, Gainesville, Fla., assignors to Varta Aktiengesellschaft, Frankfurt am Main, Germany, a corporation of Germany
Continuation-in-part of application Ser. No. 161,278, Dec. 21, 1961. This application July 28, 1965, Ser. No. 475,459
Int. Cl. H01m 27/00
U.S. Cl. 136—86
28 Claims

ABSTRACT OF THE DISCLOSURE

Method for direct production of electrical energy from a borohydride fuel in an alkaline electrolyte.

This application is a continuation-in-part of application Ser. No. 161,278, filed Dec. 21, 1961, now abandoned.

The present invention relates to a method for converting the chemical energy of complex hydrides directly into electrical energy. In this method, these compounds are electrochemically reacted in a fuel cell.

Fuel cells for obtaining electrical energy from a variety of chemical substances are known. Most of these fuels are fluids, i.e. gases or liquids. The most important fuels used for this purpose are hydrogen, the first members of the alkane series, mono- or polyhydric alcohols, aldehydes, higher hydrocarbons, and carbohydrates. If liquid, these fuels are generally dissolved or dispersed in an electrolyte. The electrochemical reaction is then effected at the so-called fuel electrode. The formation of activated hydrogen atoms which are necessary for the electrochemical process at the fuel electrode is relatively difficult with the above mentioned fuels.

It has also been proposed to use complex metal hydrides as a source of gaseous hydrogen. These chemical substances have a relatively high content by volume of hydrogen and have the additional advantage to give off hydrogen easily. Again only the gaseous hydrogen molecule is obtained and is stored or fed directly into a fuel cell with a conventional fuel electrode for gaseous hydrogen. Active hydrogen atoms are not available from these processes since any hydrogen atom at once recombines with another hydrogen atom.

It is the primary object of the present invention to obtain electrical energy directly from complex metal hydride fuels by directly utilizing the active hydrogen atoms as they are developed from the complex metal hydride and preventing formation of gaseous molecular hydrogen from these atoms. It is to be understood that due to slight inefficiencies in the actual processes and materials employed not all the loosely bonded hydrogen atoms as contained in complex metal hydrides enter directly into the electrochemical reaction at the fuel electrode and a small amount of gaseous molecular hydrogen may occur in some instances but in a process or a device according to the invention and to the respective instructions given below practically all of the hydrogen developed is prevented from forming gaseous molecular hydrogen.

This and other objects are accomplished in accordance with this invention by at least partially dissolving a complex hydride in an alkaline electrolyte, such as a potassium or sodium hydroxide solution, using a catalytic electrode which has an excess potential with respect to the reversible hydrogen potential. In operation, this electrode should have an excess potential of at least about 10 mv., preferably of at least about 40 mv., with respect to the reversible potential of hydrogen. Depending on the operating conditions and especially on the electrode surface the necessary minimum value of excess potential of the electrode with respect to the reversible hydrogen potential may be reduced below 10 mv. Especially with an electrolyte solution with a very low concentration of complex metal hydride it may be possible to prevent the formation of gaseous molecular hydrogen from the active hydrogen atoms derived from complex metal hydrides, but it must be stressed that this is only possible with such low current loads as to be worthless for commercial use.

Various methods of producing the necessary excess potential at the catalytic electrode have been found to be in accordance with the invention.

One method consists of choosing the correct metal in a suitable form. While for instance, sheet nickel and carbonyl nickel electrodes are suitable, electrodes consisting of nickel in the form of Raney-nickel do not have an excess potential with respect to the reversible hydrogen potential and are therefore not suitable. Examples of a suitable class of catalytic metals for the electrode include at least one of the alkaline resistant metals of Group VIII of the Periodic Chart of the Elements which have an atomic number ranging from 26 to 28, inclusive, and those metals which have an atomic number of 24, 29, 47, 48 and 74, inclusive. This class includes chromium, iron, cobalt, nickel, copper, silver, and cadmium. Molybdenum and tungsten are also suitable metals.

In a further embodiment of the invention, it has been discovered that the catalytic electrode of the invention can be made of an amalgam, i.e. an alloy of mercury with one or more metals. If desired there can be used an amalgam of the above-mentioned metals or any other metal. An amalgam of the metal for use in the invention may have a proportion of at least 5 percent and preferably up to 80 percent by weight of mercury. Very satisfactory performance is obtained with a proportion of about 80% Raney nickel to about 20% by weight of mercury in the alloy. Satisfactory performance is also obtained with other proportions with Raney metal and mercury, up to as much as 60% by weight of mercury. Any metal may be used for the amalgam including the above-mentioned metals of Group VIII of the Periodic Chart of the Elements, and those having an atomic number of 29, 47 and 48, such as cobalt, iron, nickel, copper, silver and cadmium, and also carbonyl metal, Raney nickel catalyst powders, etc. The above-described class of metals and the amalgams of the metals may be provided in the form of large surface or porous bodies. Furthermore, they may be deposited on catalytically inactive but electrically conductive carrier materials, such as lead, chromium, electrically conductive plastics, stainless steel. Amalgams on carbon may also be used. Carbonyl metals may also be used for the electrode, such as sintered carbonyl nickel, carbonyl cobalt, and carbonyl iron. These may be used singly or in combination. For example, good results have been achieved with a combination of 20 parts by weight carbonyl cobalt and 80 parts by weight carbonyl nickel.

It has been found in accordance with the invention, that if an electrode as described above, is fed with a complex hydride as more fully explained hereinafter, direct conversion into electrical energy, without prior conversion into gaseous molecular hydrogen of the loosely bonded hydrogen atoms of the complex metal hydride takes place. Particularly suitable complex hydrides include metal boron hydrides, preferably complex boron hydrides of the alkali metals.

The complex hydride fuels may be placed into the fuel cell either dissolved or suspended in the electrolyte, or they may be placed thereinto in solid form, i.e., they may form a solid phase at the bottom of the cell. The only essential requirement is that at least a portion of the complex hydride fuel be constantly contained in dissolved form in the alkaline electrolyte.

The amount of the complex hydride fuel in the electrolyte may be varied within very wide limits, i.e. the fuel may be contained in the electrolyte within a range of 0.05 mol/liter to 12 moles/liter, the preferred range being between about 0.1 mole/liter and 6 moles/liter. The preferred temperature range is from about −25° C. to about +40° C. and the pH range is from about 12 to about 16.5, preferably from 13 to 16.

The manner of introducing the complex metal hydride fuel into the electrolyte also is of no importance in the operation of the energy conversion. It is possible, for instance, to introduce the fuel into the electrolyte by way of the fuel electrode itself.

It is a characteristic feature of the method of the present invention that the rest potential of fuel electrodes operated with complex hydrides lies up to 160 mv. more negative than the reversible hydrogen potential at the same pH value of the electrolyte. While the present invention is not to be limited by any theories, the reason for this is assumed to be the fact that the hydrogen reacted at the fuel electrode derives from the hydrolysis equilibrium of the fuel and is supplied for reaction in high concentration and in statu nascendi. Therefore, no energy is needed for splitting hydrogen molecules into hydrogen atoms, which necessarily occurs when gaseous hydrogen, which has been produced by a reaction of the fuel substance, is used as fuel. In this manner, the method of this invention makes it possible to hold the potential of the fuel electrode below the reversible potential of hydrogen even at high current densities.

The alkaline electrolyte used in the fuel cell has an alkalinity ranging from the alkalinity of a normal aqueous sodium hydroxide solution to a 12 normal aqueous sodium hydroxide solution. The above and other features of the invention will be exemplified hereinbelow, it being clearly understood that these examples do not limit but merely illustrate the invention. Reference will also be made, as appropriate, to the accompanying drawings, wherein.

EXAMPLE 1

A sintered nickel tube having a bottom closing off one end thereof, was immersed for a length of 120 mm. in 6 N potassium hydroxide solution. The porosity of the tube and its bottom was 65% and the wall thickness 2 mm. The length of the tube was 160 mm. and its inner diameter was 25 mm.

A saturated solution of the hygroscopic sodium boron hydride ($NaBH_4$) in 8 N sodium hydroxide solution was passed through the sintered nickel tube at a temperature of −20° C. After a few seconds, the electrode showed a constant rest potential of −165 mv. relative to $Cd/Cd(OH)_2$ (corresponding to −145 mv. relative to reversible $H_2$) and this rose only to −60 mv. when a load of 100 ma./cm.$^2$ was applied.

EXAMPLE 2

Figure 1:
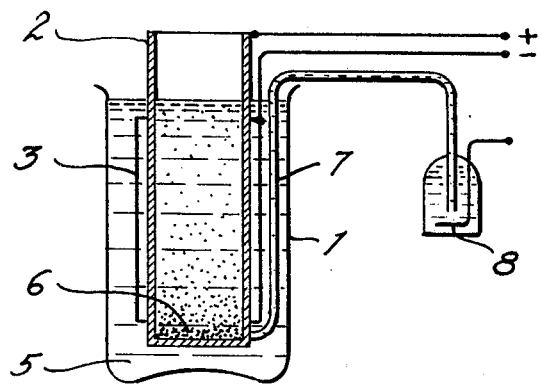
FIG. 1 shows one form of fuel cell in accordance with the invention.

As shown in FIG. 1, to which reference may now be had, a sintered nickel electrode tube 2 with closed bottom (physical parameters: porosity 80%, wall thickness 4 mm., length 15 cm., diameter 28 mm., immersion depth 13 cm.) was immersed into a 3 N potassium hydroxide electrolyte 5 contained within glass beaker 1 and the interior of the closed tube was filled through its open end with the electrolyte. For current production, tablets of potassium boron hydride were placed into the tube. Each tablet weighed 1 g. and was so loosely compressed that it was rapidly mechanically disintegrated by the alkaline solution within the tube and about 5 such tablets saturated the electrolyte with the hydride, while providing a solid phase 6 at the bottom of the tube. The further supply of tablets was so regulated that there always remained a sufficient supply of fuel suspended in the interior of the electrode tube. The resultant potential was nearly the same as in Example 1, at a temperature of +15° C.

As hydrogen liberation electrode, in the half-cell circuit arrangement shown, there is employed a cylindrical nickel sheet 3 connected to the negative terminal. There is also a capillary tube 7 and the $Cd/Cd(OH)_2$ reference electrode 8.

EXAMPLE 3

A catalytic electrode comprised of very fine-mesh nickel sieves holding sintered carbonyl nickel tablets of a diameter of 2 mm. and a thickness of 1.8 mm. was immersed in a 6 N sodium hydroxide electrolyte. A sufficient amount of lithium boron hydride was suspended in the electrolyte at a temperature of +10° C., to leave a considerable undissolved solid phase of the fuel at the bottom of the cell. After a few seconds, a rest potential of −175 mv. relative to $Cd/Cd(OH)_2$ was observed at the electrode and the cell sustained loads as well as the one in Example 1.

EXAMPLE 4

The same electrode as in Example 3 but with sintered carbonyl iron tablets of like dimensions replacing the sintered carbonyl nickel tablets of Example 3, was immersed in a pure 5 N potassium hydroxide electrolyte and potassium boron hydride was added in the form of a 2%, by weight solution in 5 N potassium hydroxide solution, which was introduced into the electrode between the tablets in the same amount as the fuel was used up by the anodic load of the fuel electrode. No difference in rest or load potential was observed as compared to the other examples, when the cell was used at a temperature of +25° C.

When under the same conditions as described above in the foregoing Examples 1–4, gaseous hydrogen or ethylene glycol was used as fuel, no current could be drawn from the fuel cell.

EXAMPLE 5

Figure 2:
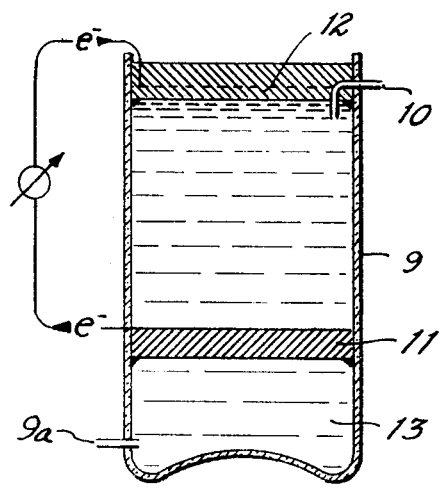
FIG. 2 shows another form of such cell.

As shown in FIG. 2, to which reference may now be had, a glass cylinder 9 is provided at the bottom with an inlet 9a and at the top with an outlet 10. Placed vertically inside cylinder 9 are fuel electrode 11 and oxygen electrode 12. The diameter of the electrodes is 4 cm. The fuel electrode 11 consists of a porous disc 0.5 cm. thick and having a pore volume of 80%. The electrode was produced in the usual manner by sintering carbonyl nickel powder having grain diameters from about 3$\mu$ to about 5$\mu$. The oxygen electrode 12 has a thickness of 0.6 cm. and was produced by heating and compressing a mixture of 65% by weight and activating the electrode with potassium cyanate as described in U.S. patent application Ser. No. 174,495, now U.S. Pat. No. 3,231,429.

For the electrolyte 13, a 10 normal aqueous solution of potassium hydroxide is used which contains 1% by weight of $KBH_4$. The electrolyte is introduced into the fuel cell via inlet 9a and removed via outlet 10. In life tests the electrodes of this cell can be subjected to a load of 50 ma./sq. cm., the potential of the cell then being about 0.8 v.

EXAMPLE 6

Carbonyl nickel and carbonyl cobalt with 75% by weight and 25% by weight were thoroughly mixed and 1 gr. of the mixture was evenly distributed in a press mould. Thereafter, a fine mesh nickel sieve with a diameter of 40 mm. was immersed shortly in nitric acid in order to facilitate adhesion and was put into the mould. Then, again 1 gr. of the mixture was distributed on the nickel sieve. The electrode was then compressed with a pressure of 1 t./sq. cm. and was sintered in a hydrogen stream at 900° C.

The finished electrode was operated in a half cell at −10° C. with a saturated solution of $KBH_4$ in 3 normal aqueous solution of KOH. The rest potential against the $Cd/Cd(OH)_2$ reference electrode was −1260 mv. At the above temperature the electrode was subjected to a load of 120 ma./sq. cm. in continuous operation using a sheet of nickel as counter electrode.

EXAMPLE 7

An electrode of 1 mm. thickness was obtained by pressing a thorough mixture of carbonyl iron powder, 75% by weight, and with a grain size of 3–5$\mu$ and of 25% by weight nickel powder with a grain size of 10–15$\mu$. A rest potential of −1240 mv. against a $Cd/Cd(OH)_2$ reference electrode was obtained when the electrode was used in a 1% $KBH_4$ solution in 10 normal aqueous solution of KOH at the operating temperature of 0° C.

EXAMPLE 8

A sintered nickel electrode was immersed in an aqueous solution of $KBH_4$. After a short time a strong dissolution of the boranate at the electrode started. The electrode was then taken out of the boranate solution and was immersed in a mercury nitrate solution after it had been washed with wtaer. The electrode at once is covered with a tightly bonded amalgam layer. This electrode was operated as the negative electrode in a half-cell circuit with a 2% $KBH_4$ solution in 6 normal aqueous solution of KOH. The rest potential with $Cd/Cd(OH)_2$ as a reference electrode was −1300 mv. at a temperature of 25 degrees C.

EXAMPLE 9

Activated Raney-nickel with a grain size of 3 to 5$\mu$ was washed for a short time after the activating process, and was then immersed in mercury, and in this manner it was covered with an amalgam layer and gaseous hydrogen was developed. A mercury content of 62.3% was found by chemical analysis. The amalgamated Raney-nickel was packed between sieves and the resulting electrode was operated as a half-cell in a 5% sodium boranate solution in 10 normal aqueous solution of NaOH at a temperature of 5 degrees C. with a saturated $$Cd/Cd/(OH)_2$$

as a reference electrode and a rest potential of −1315 mv. was found for this electrode.

EXAMPLE 10

One part by weight Raney wolfram powder and 0.8 part by weight carbonyl nickel were thoroughly mixed and a sinter plate produced from the mixture was operated as an electrode in a 10% potassium boranate solution in 1 normal aqueous solution of KOH after activation with $Cd/Cd/(OH)_2$ as a reference electrode and a rest potential of 1280 mv. was obtained.

EXAMPLE 11

A thorough mixture was prepared from 90% by weight carbonyl nickel powder with a grain size of 5–7$\mu$ and 10% by weight carbonyl cobalt with a grain size of 5–7$\mu$ to be used in forming the cover layer of a double layer electrode. A second was prepared by mixing 65% by weight of the above mixture with 35% by weight of ammonium carbonate, to be used in forming the working layer of the electrode. Of the cover layer mixture 20 gr. were evenly distributed in a rectangular press mold of 12.5 by 10.5 cm. and on top of this layer 120 gr. of the working layer mixture were evenly distributed. With a pressure of 0.5 t./sq. cm. a body of about 3 mm. thickness was produced, which was then fixed in a device which prevents warping of the electrode during the sintering. The electrode was sintered for 20 minutes at a temperature of 850° C. in a hydrogen stream. The cover layer part of the finished electrode was then impregnated with a hot wax. The electrode was then placed into a 8% by weight hot acetic acid, and after a few minutes it was immersed in an aqueous mercury nitrate solution. The nickel and cobalt contained in part of the working layer was amalgamated by this process. This electrode was then incorporated as the fuel electrode in a fuel cell for the electrochemical conversion of potassium boron hydride.

A typical fuel cell for operating the process of the invention consisted of a cell housing, a conventional gas diffusion double layer oxygen electrode forming one wall of an electrolyte space which was filled with 6 normal aqueous solution of potassium hydroxide and separated from a second electrolyte space by the fuel electrode the latter space being filled with an electrolyte of approximately 6 normal aqueous solution of potassium hydroxide which also contained a supply of at least partially dissolved potassium boron hydride fuel. The electrodes were provided with current conducting means. The fuel electrode also contained the cover layer, an amalgamated working layer and attached insulating top and bottom. The oxygen electrode consisted of a cover layer, a working layer, an electrically insulating bottom, means for the supply of oxygen to the electrode and means for supplying potassium boron hydride to the space 13.

In other embodiments the electrolyte was not forced through the fuel electrode from the outside. Instead the electrodes were oriented vertically and the fuel renewed by adding solid sodium boron hydride as necessary depending upon the output from the fuel cell. Although one such embodiment had an electrolyte volume of only 540 cc., even after a life test of eleven weeks' duration, no precipitation of potassium borate or sodium borate was discernible.

In place of the complex boron hydrides mentioned in the preceding examples, there can be employed other complex hydrides such as aluminum boron hydride and zinc boron hydride, provided they are soluble and stable in alkaline electrolytes.

A special advantage of the employment of complex hydrides as a fuel in fuel cells lies in the fact that considerably higher current densities can be obtained from these cells, than was possible to do so far, without the occurrence of a noticeable potential deterioration. An additional advantage of the invention lies in the fact, that the fuel electrodes which have been developed for use with other liquid fuels can be used, provided they are alkaline resistant. This applies even if these electrodes do not normally show an excess potential with respect to the reversible hydrogen potential, because the excess potential can be assured by amalgamating the electrode.

In the case of carbonyl metals with a low density and a high inner surface, for example, Mond nickel T255 with a grain size from 2.4 to 3.6$\mu$ and a density of 0.58 gr./ccm., it has been observed that possibly due to the high inner surface of the material gaseous hydrogen is developed unless the material is used in a sintered form.

Figure 3:
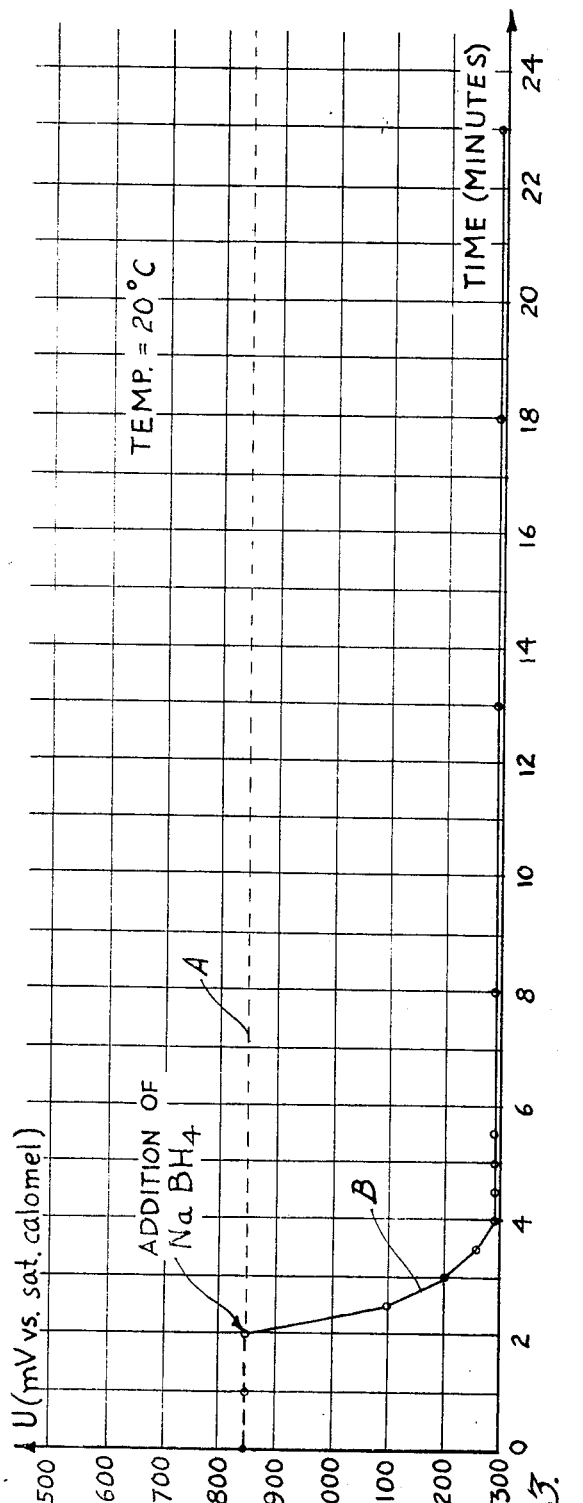
FIGS. 3 and 4 are two graphs illustrating certain operating characteristics of the apparatus embodying the invention.
Figure 4:
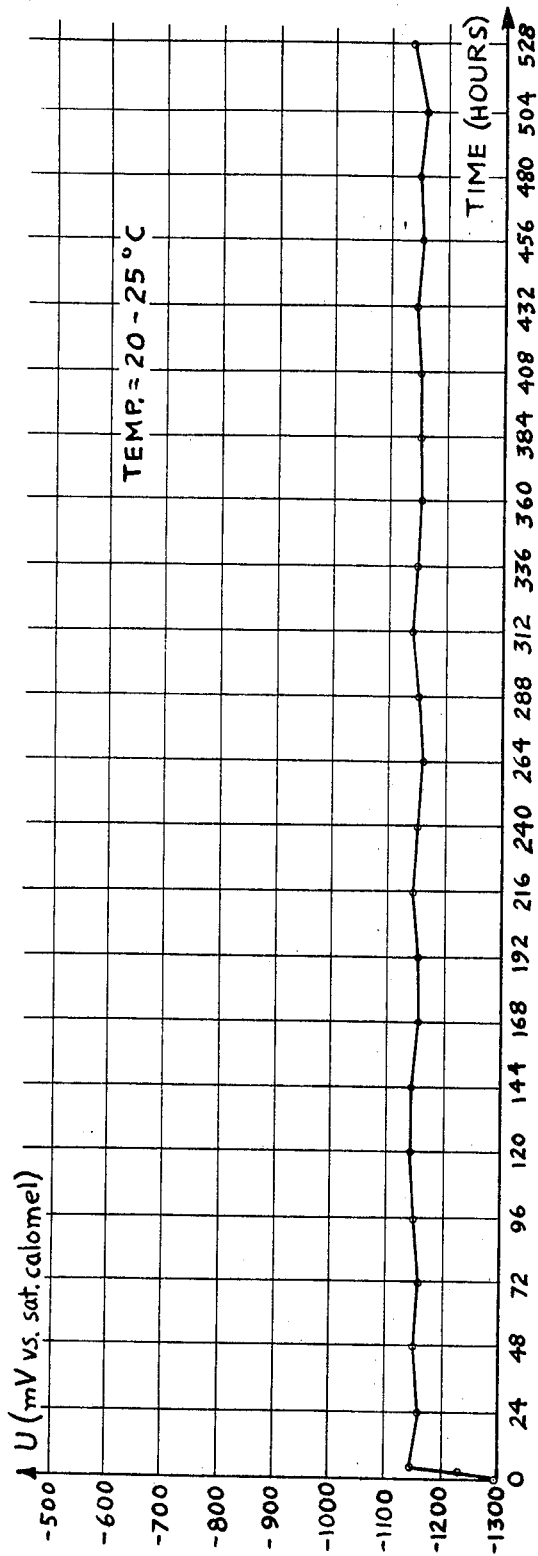

Certain advantages of this invention are graphically illustrated in FIGS. 3 and 4. Specifically FIG. 3 shows the difference between a fuel cell using a cobalt electrode and using gaseous hydrogen as a fuel and one which employs direct conversion from metal boron hydride in accordance with the present invention. As shown by broken line A in FIG. 3, the former shows no tendency to reach its rest potential. On the other hand, when boron hydride is introduced, then, as shown by solid line B in FIG. 3, the ultimate rest potential is attained in as little as two minutes.

FIG. 4 shows the results of a life test on a sintered carbonyl nickel electrode, which reveals that at a load of 50 ma./sq. cm., the rest potential measured against a saturated calomel reference electrode decays from minus 1290 mv. to minus 1150 mv. during the first four hours, but then remains practically constant for the next 500 hours.

This demonstrates the remarkable performance and durability characteristics of the present invention.

While the invention has been described in connection with certain preferred embodiments thereof, it will be understood that many variations and modifications may occur to the skilled in the art without departing from the spirit and scope of the invention, as defined in the appended claims.

We claim:

1. An electrochemical process for converting directly the chemical energy of a complex metal hydride to electrical energy without prior conversion of the hydrogen atoms of the hydride into gaseous molecular hydrogen which comprises supplying an at least partially dissolved complex metal hydride fuel in the alkaline electrolyte of a fuel cell the electrolyte having at least the alkalinity of an 1 normal aqueous sodium hydroxide solution and up to 12 normal aqueous sodium hydroxide solution, supplying an oxidant to the oxidant electrode of said fuel cell and carrying out the direct electrochemical conversion of the loosely bonded hydrogen atoms of the complex metal hydride into hydrogen ions at a fuel electrode having an excess potential with respect to the reversible hydrogen potential.

2. The process of claim 1 in which the conversion to electrical energy occurs without prior decomposition of the hydride into gaseous molecular hydrogen.

3. An electrochemical process for converting directly the chemical energy of a complex metal hydride to electrical energy without prior conversion of the hydrogen atoms of the hydride into gaseous molecular hydrogen which comprises carrying out the conversion of an at least partially dissolved complex metal hydride fuel in the alkaline electrolyte of a fuel cell comprising a catalytic fuel and oxidant electrode to which an oxidant is supplied, the electrolyte being selected from the group consisting of the aqueous solutions of potassium hydroxide and of sodium hydroxide of at least the alkalinity of 1 normal aqueous sodium hydroxide solution and up to 12 normal aqueous sodium hydroxide solution, and which process comprises converting the loosely bonded atoms of the complex metal hydride into hydrogen ions at a fuel electrode having an excess potential with respect to the reversible hydrogen potential.

4. The process of claim 3 in which the complex metal hydride fuel is provided as a solid phase.

5. The process of claim 3 in which the electrolyte is strongly alkaline of at least the alkalinity of a 4 to 10 normal aqueous sodium hydroxide solution.

6. An electrochemical process for converting directly the chemical energy of a complex metal boron hydride to electrical energy without prior conversion of the hydrogen atoms of the hydride into gaseous molecular hydrogen which comprises using as a source of electrical energy an at least partially dissolved complex metal boron hydride fuel in the alkaline electrolyte of a fuel cell to which an oxidant is supplied to the oxidant electrode, the electrolyte being selected from the group consisting of the aqueous solutions of potassium hydroxide and of sodium hydroxide of at least the alkalinity of an 1 normal aqueous sodium hydroxide solution and up to 12 normal aqueous sodium hydroxide solution, and which comprises the direct electrochemical conversion of the loosely bonded hydrogen atoms of the complex metal boron hydride into hydrogen ions at a fuel electrode having an excess potential with respect to the reversible hydrogen potential and withdrawing electric current from said electrode.

7. An electrochemical process for converting directly the chemical energy of an alkali metal hydride to electrical energy without prior conversion of the hydrogen atoms of the hydride into gaseous molecular hydrogen in a fuel cell to which an oxidant is supplied to the oxidant electrode which comprises converting the loosely bonded atoms of an at least partially dissolved alkali metal hydride fuel in the alkaline electrolyte of the fuel cell selected from the group consisting of the aqueous solutions of potassium hydroxide and of sodium hydroxide of at least the alkalinity of an 1 normal aqueous sodium hydroxide solution and up to 12 normal aqueous sodium hydroxide solution, into hydrogen ions at a fuel electrode having an excess potential with respect to the reversible potential.

8. An electrochemical process for converting directly the chemical energy of an alkali metal boron hydride to electrical energy without prior conversion of the hydrogen atoms of the hydride into gaseous molecular hydrogen which comprises using at least a partially dissolved alkali metal boron hydride fuel in the alkaline electrolyte of a fuel cell to which an oxidant is supplied to the oxidant electrode selected from the group consisting of the aqueous solutions of potassium hydroxide and of sodium hydroxide of at least the alkalinity of an 1 normal aqueous sodium hydroxide solution and up to 12 normal aqueous sodium hydroxide solution, as a source of electrical energy at a fuel electrode having an excess potential with respect to the reversible hydrogen potential.

9. An electrochemical process for converting directly the chemical energy of sodium boron hydride to electrical energy without prior conversion of the hydrogen atoms of the hydride into gaseous molecular hydrogen which comprises using as a source of electrical energy an at least partially dissolved sodium boron hydride fuel in the alkaline electrolyte of a fuel cell to which an oxidant is supplied to the oxidant electrode, the electrolyte being selected from the group of the aqueous solutions of potassium hydroxide and of sodium hydroxide of at least the alkalinity of an 1 normal aqueous sodium hydroxide solution and up to 12 normal aqueous sodium hydroxide solution, and directly converting of the loosely bonded hydrogen atoms of the sodium boron hydride into hydrogen ions at a fuel electrode having an excess potential with respect to the reversible hydrogen potential.

10. An electrochemical process for converting directly the chemical energy of a potassium boron hydride to electrical energy without prior conversion of the hydrogen atoms of the hydride into gaseous molecular hydrogen which comprises at least partially dissolving the potassium boron hydride fuel in the alkaline electrolyte of a fuel cell to which an oxidant is supplied to the oxidant electrode, the electrolyte being selected from the group consisting of the aqueous solutions of potassium hydroxide and of sodium hydroxide of at least the alkalinity of an 1 normal aqueous sodium hydroxide solution and up to 12 normal aqueous sodium hydroxide solution and which comprises the direct electrochemical conversion of the loosely bonded hydrogen atoms of the potassium boron hydride into hydrogen ions at a fuel electrode having an excess potential with respect to the reversible hydrogen potential.

11. An electrochemical process for converting directly the chemical energy of a complex metal hydride to electrical energy without prior conversion of the hydrogen atoms of the hydride into gaseous molecular hydrogen which comprises at least partially dissolving a complex metal hydride fuel in the alkaline electrolyte of a fuel cell to which an oxidant is supplied to the oxidant electrode, the electrolyte being of at least the alkalinity of an 1 normal aqueous sodium hydroxide solution and up to 12 normal aqueous sodium hydroxide solution and which comprises the direct electrochemical conversion of the loosely bonded hydrogen atoms of the complex metal hydride into hydrogen ions at a fuel electrode having an excess potential with respect to the reversible hydrogen potential said electrode including at least one of the metals selected from the group consisting of the elements having atomic number 24, 26 to 29, inclusive 42, 47, 48, and 74.

12. The process of claim 11 characterized in that said electrode includes at least one of the metals selected from the group of cobalt, nickel, copper, iron, cadmium, chromium, molybdenum, and tungsten.

13. The process of claim 11 characterized in that said metal is present in that electrode as an amalgamated metal.

14. An electrochemical process for converting directly the chemical energy of a complex metal hydride to electrical energy without prior conversion of the hydrogen atoms of the hydride into gaseous molecular hydrogen which comprises at least partially dissolving a complex metal hydride fuel in the alkaline electrolyte of a fuel cell to which an oxidant is supplied to the oxidant electrode, the electrolyte being of at least the alkalinity of an 1 normal aqueous sodium hydroxide solution and up to 12 normal aqueous sodium hydroxide solution and which comprises the direct electrochemical conversion of the loosely bonded hydrogen atoms of the complex metal hydride into hydrogen ions at a fuel electrode having an excess potential with respect to the reversible hydrogen potential said electrode including a metal amalgam.

15. The process of claim 11 characterized in that said metal included in said electrode is coated on an electrically conductive carrier material selected from the group of lead, chromium and stainless steel.

16. The process of claim 14 characterized in that said metal amalgam comprises Raney-nickel and mercury, said mercury being present in the proportions of from 5% to about 80% by weight.

17. An electrochemical process for converting directly the chemical energy of a complex metal hydride to electrical energy without prior conversion of the hydrogen atoms of the hydride into gaseous molecular hydrogen which comprises at least partially dissolving a complex metal hydride fuel in the alkaline electrolyte of a fuel cell to which an oxidant is supplied to the oxidant electrode, the electrolyte being of at least the alkalinity of an 1 normal aqueous sodium hydroxide solution and up to 12 normal aqueous sodium hydroxide solution and which comprises the direct electrochemical conversion of the loosely bonded hydrogen atoms of the complex metal hydride into hydrogen ions at a fuel electrode having an excess potential with respect to the reversible hydrogen potential said electrode including at least one carbonyl metal selected from the group consisting of carbonyl cobalt, carbonyl nickel, carbonyl iron, and sintered carbonyl nickel.

18. A process which comprises contacting in an electrolyte in a fuel cell, an electrode which has an excess potential with respect to the reversible potential of hydrogen with an alkaline electrolyte having an alkalinity in the range of that of an aqueous sodium hydroxide solution of a normality of 1 to 12, said electrolyte comprising a complex metal hydride fuel at least partially dissolved in the electrolyte, and converting essentially all of the loosely bonded hydrogen atoms of the complex metal hydride directly into hydrogen ions.

19. The process of claim 18 in which the electrode has an excess potential of at least about 10 mv. with respect to the reversible potential of hydrogen.

20. A process for the direct production of electrical energy in a fuel cell of the type having a pair of inert, electrically conductive, nonconsumable, catalytic fuel and oxidant electrodes mounted in spaced apart relation to each other within a compartment containing an aqueous electrolyte, which comprises supplying an oxidant to the oxidant electrode, supplying a borohydride fuel to the fuel electrode and maintaining the pH of the electrolyte at a value greater than 7.

21. The process of claim 20 in which the hydride is an alkali metal boron hydride.

22. The process of claim 20 in which the pH of the electrolyte comprising the hydride is from about 12 to 16.5.

23. The process of claim 20 in which the electrolyte comprises about 0.05 to 6 moles per liters of the hydride.

24. The process of claim 20 in which the electrode has a rest potential which is up to 160 mv. more negative than the reversible hydrogen potential at the same pH value of electrolyte.

25. The process of claim 20 in which the electrode has an excess potential of at least 10 mv. with respect to the reversible potential of hydrogen.

26. The process of claim 20 in which the electrode comprises at least one of the catalytic, alkaline-resistant metals of Group XIII of the Periodic Chart of the Elements which have an atomic number of 24, 26 to 29 inclusive and 47 and 48 inclusive.

27. The process of claim 26 in which the electrode is a metal amalgam.

28. An electrochemical process for converting directly the chemical energy of lithium boron hydride to electrical energy without prior conversion of the hydrogen atoms of the hydride into gaseous molecular hydrogen which comprises at least partially dissolving the lithium boron hydride fuel in the alkaline electrolyte of a fuel cell to which an oxidant is supplied to the oxidant electrode, the electrolyte being selected from the group of the aqueous solutions of potassium hydroxide and of sodium hydroxide of at least the alkalinity of an 1 normal aqueous sodium hydroxide solution and up to 12 normal aqueous sodium hydroxide solution and which comprises the direct electrochemical conversion of the loosely bonded hydrogen atoms of the lithium boron hydride into hydrogen ions at a fuel electrode having an excess potential with respect to the reversible hydrogen potential.

References Cited

UNITED STATES PATENTS 3,234,562  2/1966  Bell et al. _____ 204—1
2,925,454  2/1960  Justi et al. _____ 136—86

OTHER REFERENCES

Pescok, Journal American Society, vol. 75, 2862–64.

WINSTON A. DOUGLAS, Primary Examiner

H. A. FEELEY, Assistant Examiner